United States Patent [19]

Toselli

[11] Patent Number: 5,641,030
[45] Date of Patent: Jun. 24, 1997

[54] POWERED TRACKED VEHICLE SUITABLE FOR CARRIAGES FOR THE DISABLED

[75] Inventor: Emilio Toselli, San Lazzaro di Savena, Italy

[73] Assignee: T.G.R. S.r.l., Bologna, Italy

[21] Appl. No.: 403,624

[22] Filed: Mar. 14, 1995

[30] Foreign Application Priority Data

Mar. 21, 1994 [IT] Italy .................. BO94A0116

[51] Int. Cl.⁶ ............................................. B62D 55/00
[52] U.S. Cl. .................. 180/9.32; 180/169; 180/907; 280/5.22; 280/DIG. 10; 340/870.29; 356/4.01
[58] Field of Search ............... 180/9.23, 9.32, 180/167, 169, 907; 280/5.2, 5.22, 5.24, DIG. 10; 340/800.29; 356/4.01, 4.07, 4.08, 11, 18

[56] References Cited

U.S. PATENT DOCUMENTS

| | | | |
|---|---|---|---|
| 4,483,407 | 11/1984 | Iwamoto et al. | 280/DIG. 10 |
| 4,915,184 | 4/1990 | Watkins | 180/9.32 |
| 5,026,153 | 6/1991 | Suzuki et al. | 180/167 |
| 5,123,495 | 6/1992 | Littlejohn et al. | 180/907 |
| 5,248,007 | 9/1993 | Watkins | 280/DIG. 10 |

FOREIGN PATENT DOCUMENTS 0537698  4/1993  European Pat. Off. .

Primary Examiner—Anne Marie Boehler
Attorney, Agent, or Firm—Larson and Taylor

[57] ABSTRACT

The powered tracked vehicle is equipped with photocells (13, 45) which monitor its backward and forward movements and automatically modify their orientation according to whether the vehicle is travelling on the level or negotiating stairs or a slope. The inclinometer (25) that monitors the attitude of the chair is located in a protected inner part of the frame (3) and is connected to the chair itself by means of a hinged parallelogram (57, 59, 103, 105). The inclinometer is mounted on one of the sides of the hinged parallelogram via a pivoting support (61) which, by means of a sheathed cable (66, 65) and a feeler (67), detects whether the vehicle's front runner (70) is raised or lowered and transmits to the chair the advance backward tilt required when beginning to descend a flight of stairs. Other devices are also provided to make the vehicle as safe to operate as possible.

11 Claims, 10 Drawing Sheets

POWERED TRACKED VEHICLE SUITABLE FOR CARRIAGES FOR THE DISABLED

DESCRIPTION

In the course of constructing and using the powered tracked vehicle described in Italian patent application no. BO91A-000382 belonging to the present applicant, and to the whole of which reference should be made, a number of modifications and improvements have been found to be useful and these form the subject of the present disclosure. The powered vehicle in question was equipped with optoelectronic-type range finders, hereinafter referred to briefly as "photocells", located in front, behind and in the middle of the vehicle and all fixed and pointing downwards and perpendicularly to the theoretical track supporting surface. This use of the photocells was found to limit the operational safety of the vehicle and it therefore became necessary to devise initial improvements that would overcome this problem.

The vehicle also had an inclinometer for detecting changes in the tilt of the chair when negotiating stairs: the inclinometer controlled the actuator connected to the chair in such a way as to ensure that its base was always approximately horizontal. The inclinometer was mounted on one side of the chair, but this position was found to be too exposed and unsafe. It was therefore necessary to devise further improvements in order that the inclinometer could be mounted in a safe hidden position away from the chair and in order that, even though not directly mounted on the chair itself, this component would nevertheless be sensitive to changes in the tilt of the chair.

Other improvements were then adopted in the construction of the device connecting the inclinometer to the so-called feeler or front runner of the vehicle in order that the backward tilting of the chair, when said front runner was let down whenever beginning to descend stairs, took place earlier, because the previous device was found to be not altogether reliable.

In order to improve the operational safety of the vehicle, a microswitch was then used to detect the change in attitude of the chair with respect to the supporting frame, and other circuits which will be described below were adopted.

BRIEF DESCRIPTION OF THE DRAWINGS

These and other features of the invention, and the advantages they provide, will become clear in the following description of a preferred embodiment thereof, illustrated purely as a non-restrictive embodiment in the figures of the six attached sheets of drawings, in which.

DESCRIPTION OF THE PREFERRED EMBODIMENTS

Figure 1:
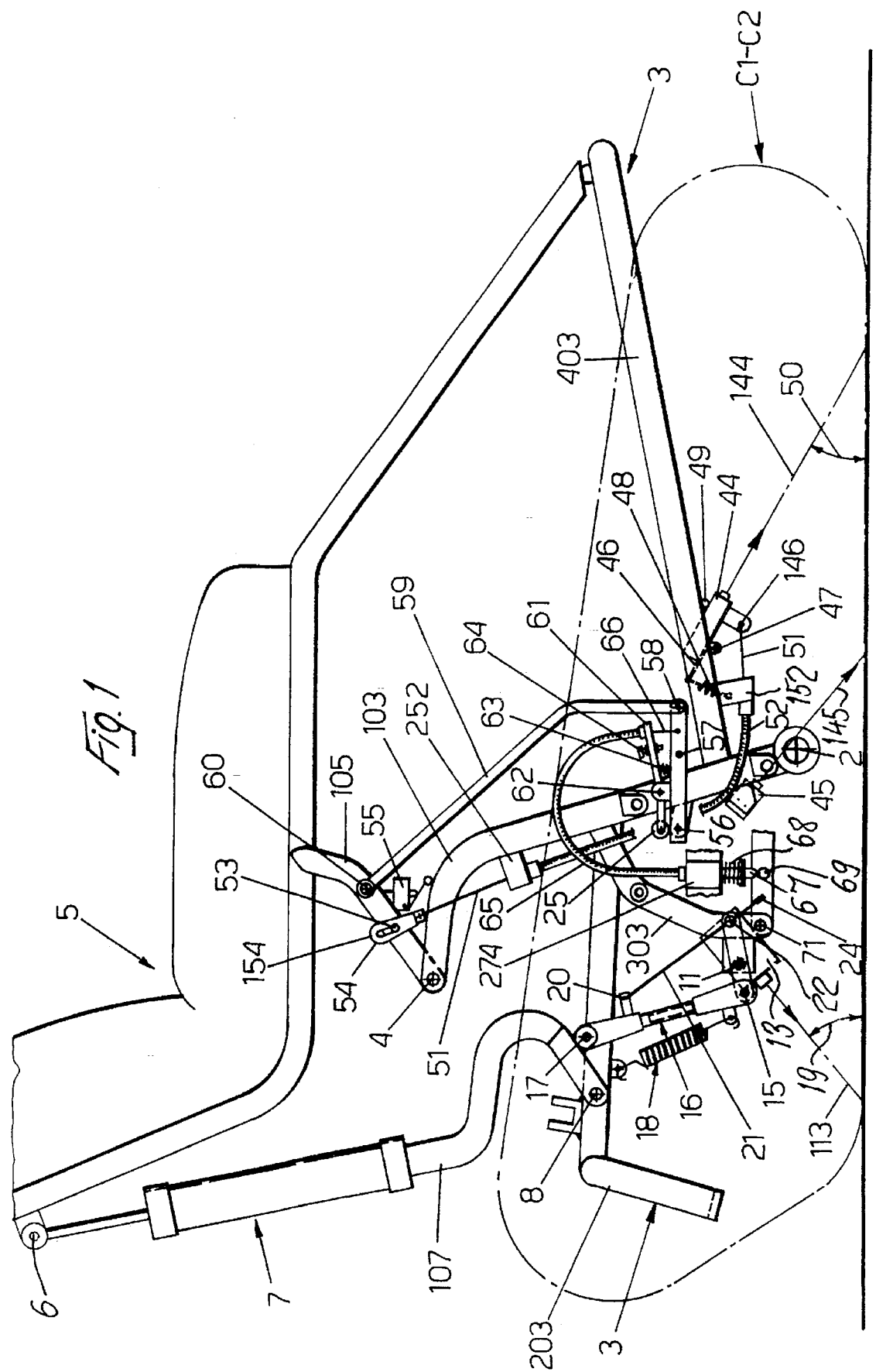
FIG. 1 is a diagrammatic side elevation of the vehicle with the photocells in the position for travelling on the level.

In FIG. 1, C1 and C2 indicate the parallel tracks alongside each other, powered as described in the patent application cited in the introduction to the present account and pivoting on a transverse axis at 2 on the frame 3 which has parallel raised parts 103 hinged to pairs of lower arms 105 of the frame of the chair 5 on which the disabled person sits. The backrest of the chair 5 is hinged at an intermediate point 6 to the rod of a double-acting hydraulic cylinder 7 whose body is fixed to a shaped arm 107 hinged at hinge 8 to a rearward extension 203 of the frame 3.

Figure 2:
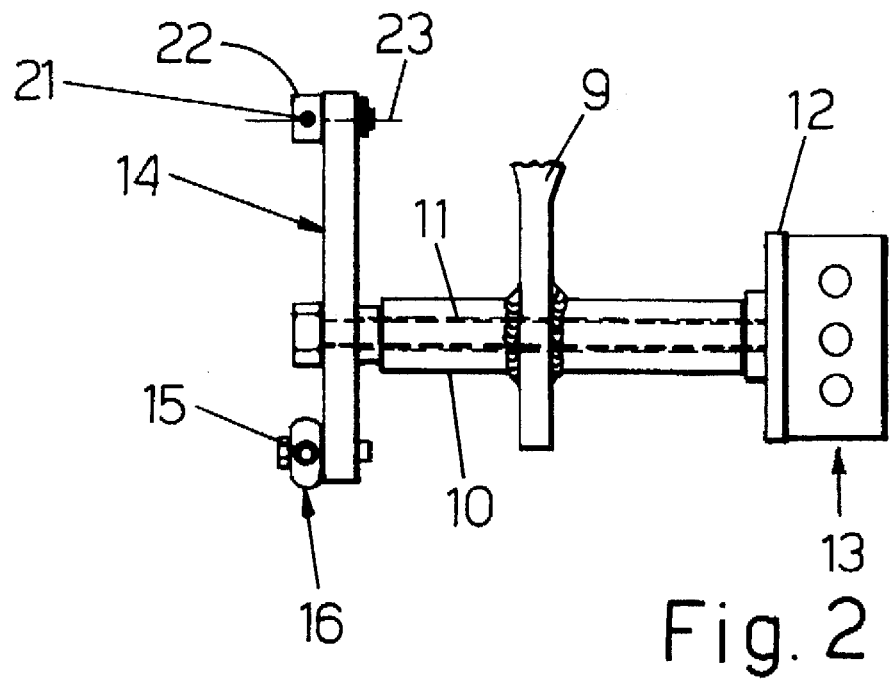
FIG. 2 is a plan view from above of the pivoting unit on which the rear photocell is mounted.

That said, and with reference to FIGS. 1 and 2, it can be seen that there is fixed to a projection 9, which is integral with the rear bottom centre part 303 of the frame 3 and supports in a hinged manner the front runner (see below), a horizontal bush 10 lying transversely relative to the vehicle and in which there rotates a pin 11, integral with which, on the end nearest the neighbouring track, is a support 12 on which the rear photocell 13 is mounted, while the other end of said pin is fixed perpendicularly to the intermediate part of a lever 14 hinged at hinge 15 to the end of a telescopic rod 16, which in turn is hinged at its top end at hinge 17 to a lug integral with the part 107 of the hydraulic cylinder 7 that controls the attitude of the chair. The lower part of the telescopic rod 16 is connected to a tension spring 18 secured to a lug integral with the frame part 203 in order to stress said rod in contraction. When the vehicle is set for travelling on the level, the telescopic rod 16 is fully contracted and the field of view 113 of the photocell 13 is pointing backwards and forming with the horizontal track supporting surface an internal angle 19 of suitable amplitude, e.g. approximately 40°. The backward orientation of the photocell 13 and its particular inclination as stated previously, make it possible to detect, sufficiently in advance and with sufficient optical amplification, any voids on the surface over which the vehicle is travelling. As stated in the previous patent, the vehicle climbs stairs in reverse (see below).

Integral with the upper part of the telescopic rod 16 is a lateral projection 20 to which the end of a steel cable 21, or other suitable means is attached. This passes through a bush 22 mounted perpendicularly and rotatably about its own axis 23 on the other end of the lever 14. The cable 21 passes through this bush, projects from it by a suitable length and has an integral enlargement 24 on its free end.

The distance between the axes of the pin 11 and the bush 22 is equal to the distance between the upper hinges 8, 17, but is greater than the distance between said pin 11 and the hinge 15.

Figure 3:
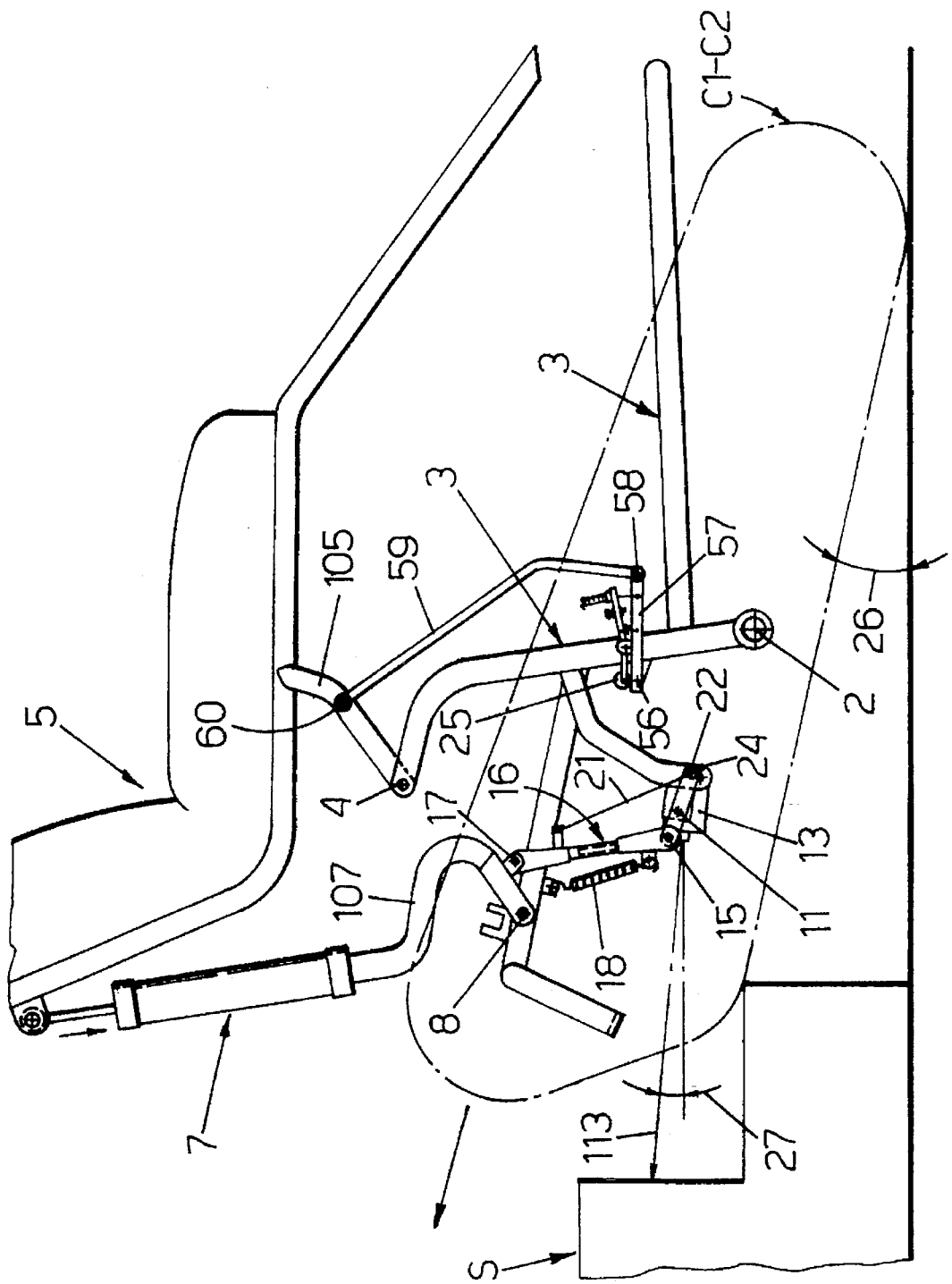
FIGS. 3, 4, 5 and 6 are diagrammatic side views of the vehicle at successive stages during the climbing of a flight of stairs.

While climbing a flight of stairs in reverse, the vehicle functions as follows. Referring also to FIG. 3, it can be seen that the tracks C1 and C2 begin to climb the first step of the stairs S and, in response to a command from the inclinometer 25, which is suitably mounted on the vehicle as stated above to detect any change in the attitude of the chair and controls the hydraulic cylinder 7 in such a way that the base of the chair is always approximately horizontal, the part 107 of this cylinder swings backwards and raises the hinge point 17 of the telescopic rod 16, which remains contracted because of the action of the spring 18, thus bringing about the progressive clockwise rotation of the lever 14 and the consequent upward rotation of the photocell 13 and of its field of view 113. When the underside of the tracks forms an angle 26 of approximately 13°–15° with the horizontal (FIG. 3), the field of view 113 of the photocell 13 is pointed upwards and forms an angle 27 of approximately 5° with the horizontal, while the enlarged end 24 of the cable 21 comes into abutment with the guide bush 22. In this way the photocell is in the best position to detect the series of risers of the steps and detect sufficiently in advance the upper limit of the flight of stairs in order to operate as stated above.

As the vehicle continues to climb the stairs, each increase in the angle 26 marked in FIG. 3 causes a proportional backward rotation of the part 107 of the hydraulic cylinder 7, involving a raising of the upper part of the telescopic rod 16, which lengthens, and a downward rotation of the photocell 13 because of the pull of the cable 21 on the lever 14. Because the "lever arms" 11–22 and 8–17 are equal, any increase in the upward tilt of the tracks beyond the 13°–15° already mentioned causes an equal downward rotation of the photocell 13, whose field of view therefore continues to point upwards and to form an angle 27 of approximately 5° with the horizontal, as visible in FIG. 4.

Figure 4:
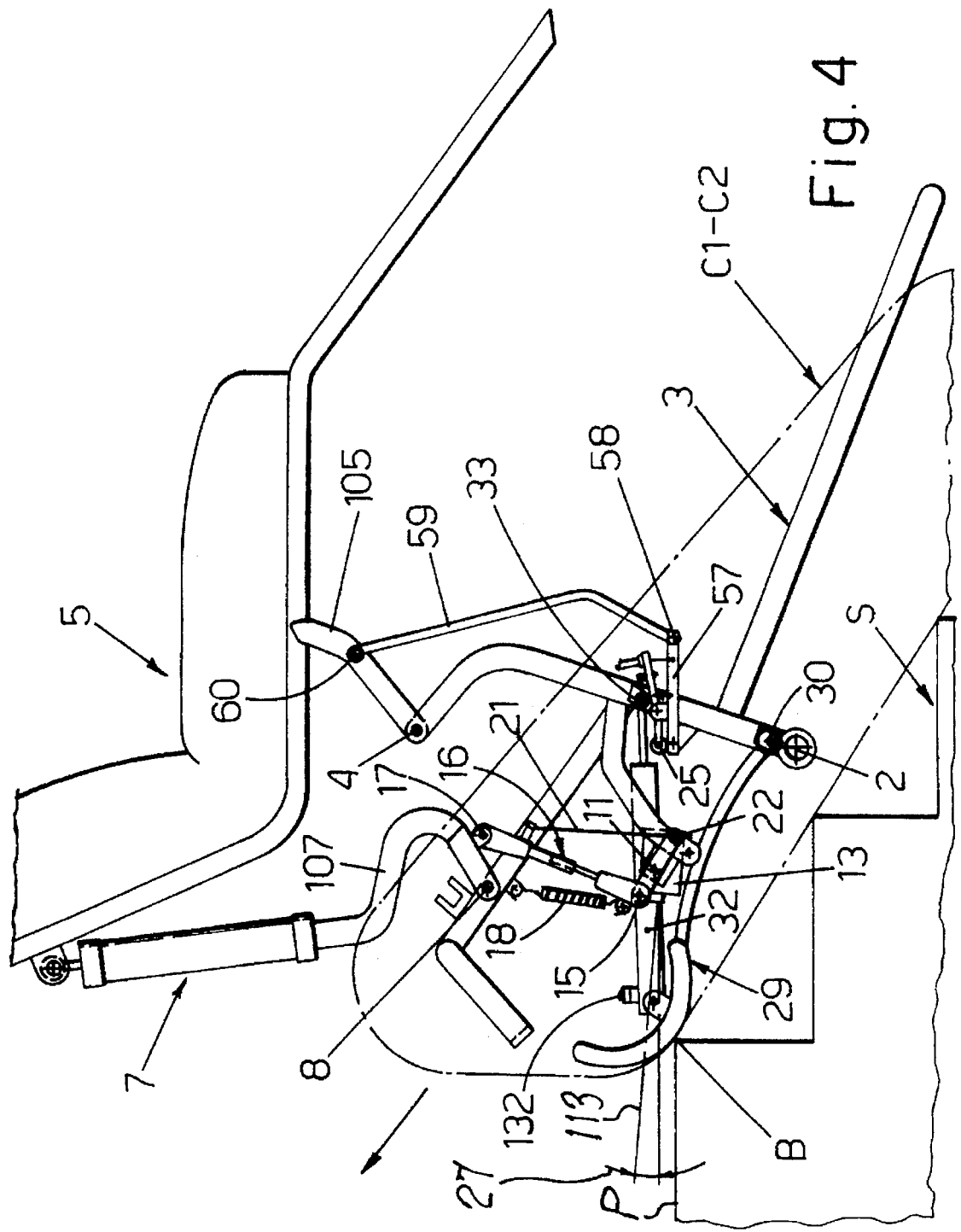
Figure 10:
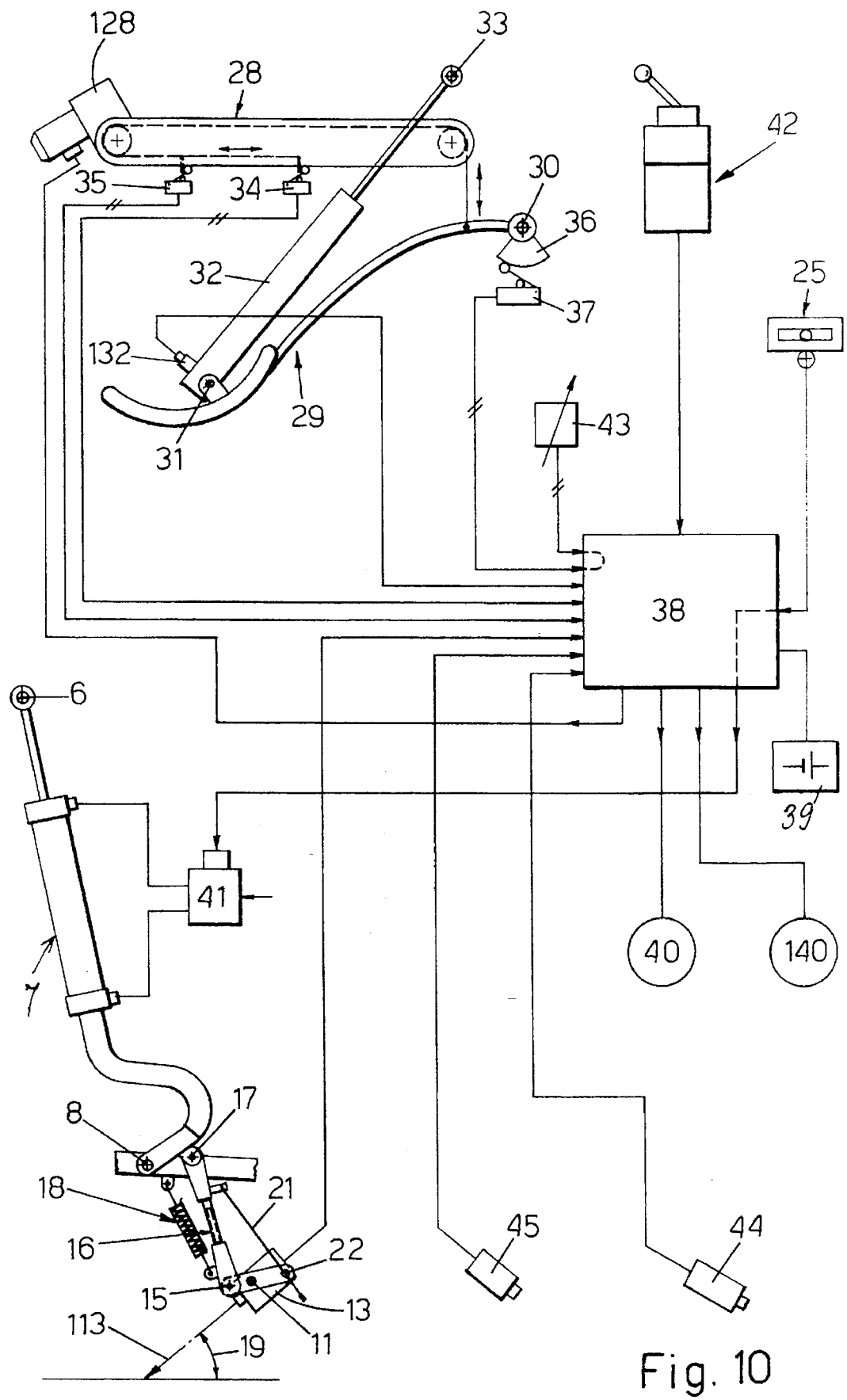
FIGS. 10 and 11 are partly functional block diagrams of the main electrical and fluid-operated circuits of the vehicle.

In FIG. 4 it can be seen that when the field of view of the photocell 13 has passed the edge B of the upper landing P of the stairs, the photocell, thanks to said 5° upward inclination, swiftly detects a void and triggers the activation of the motor-driven winch 28, FIG. 10, as known from the patent application cited in the introduction, mounted on the rear part of the frame 3 and connected to the rear runner 29—also known—hinged at hinge 30 to said frame 3 and connected at its cradle-like other end, at hinge 31, to a damper 32, which in turn is anchored at hinge 33 to the same frame 3. 34 and 35 indicate the limit microswitches of the winch 28, while 37 indicates the microswitch actuated by the cam 36 fixed to the end near the pivot 30 of the runner 29. All the abovementioned microswitches are connected to a control unit 38 that is connected to the electric supply accumulators 39, which powers the motors 40, 140 for moving the vehicle and the motor 128 of the winch 28 that operates the solenoid valves of the central hydraulic unit 41 which supplies the cylinder 7 and the other hydraulic components of the vehicle, and to which are connected not only the photocell 13, inclinometer 25, pressure switch 132 of the damper 32 and unit 42 of controls normally located on an arm of the chair 5 and which the user can operate, but also a timer circuit 43 which is useful for the following purposes. When the photocell 13 causes the runner 29 to drop down, as already stated with reference to FIG. 4, if within the interval of time established by said circuit 43 the microswitch 37 has not signalled the downward rotation of this runner, the control unit 38 stops the reverse movement of the vehicle which under these conditions can only travel forwards and descend the stairs. This safety condition is also useful when the vehicle is travelling in reverse and on the level and when the field of view 113 of the photocell 13 unexpectedly encounters a void.

Figure 5:
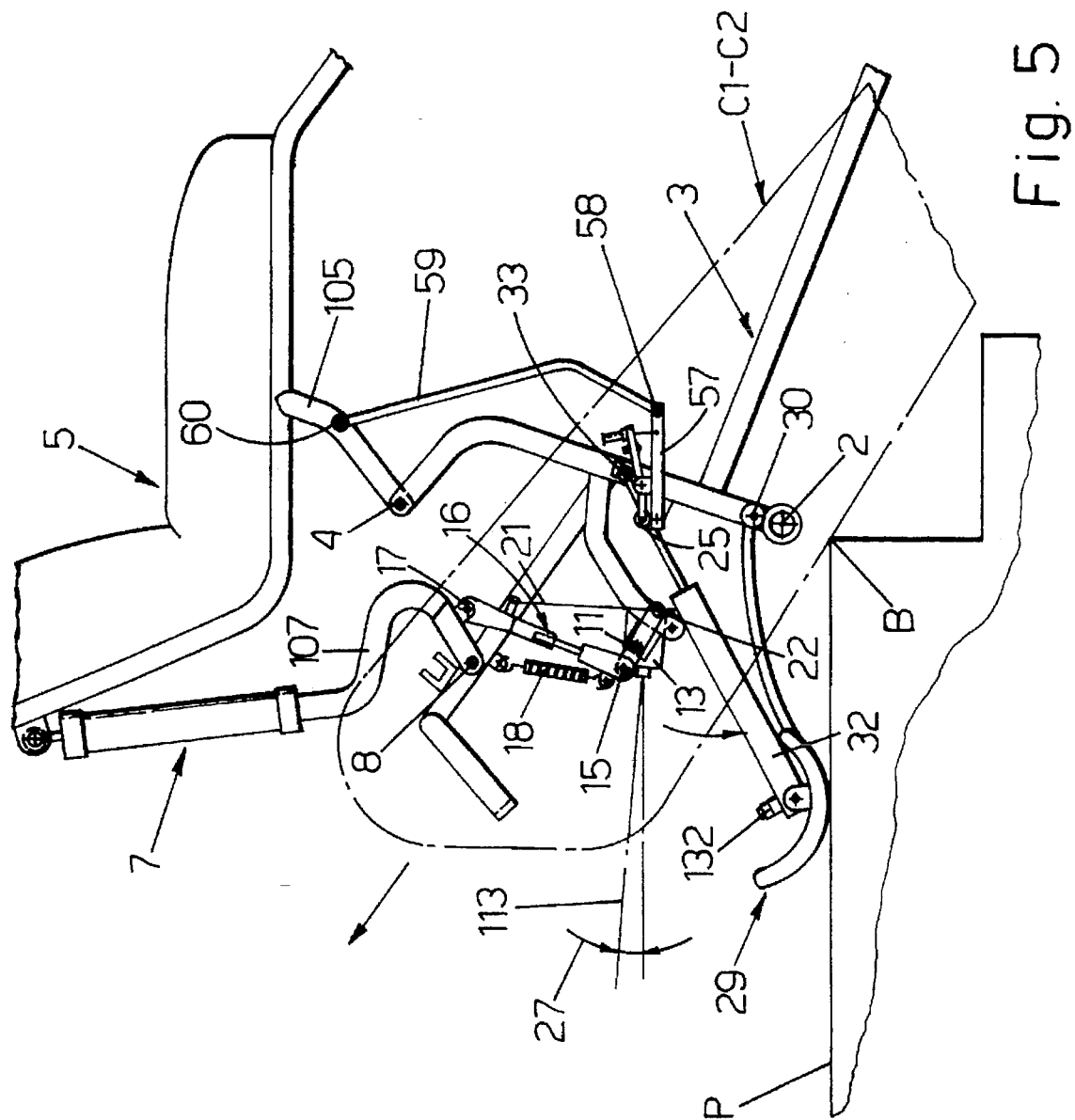
Figure 6:
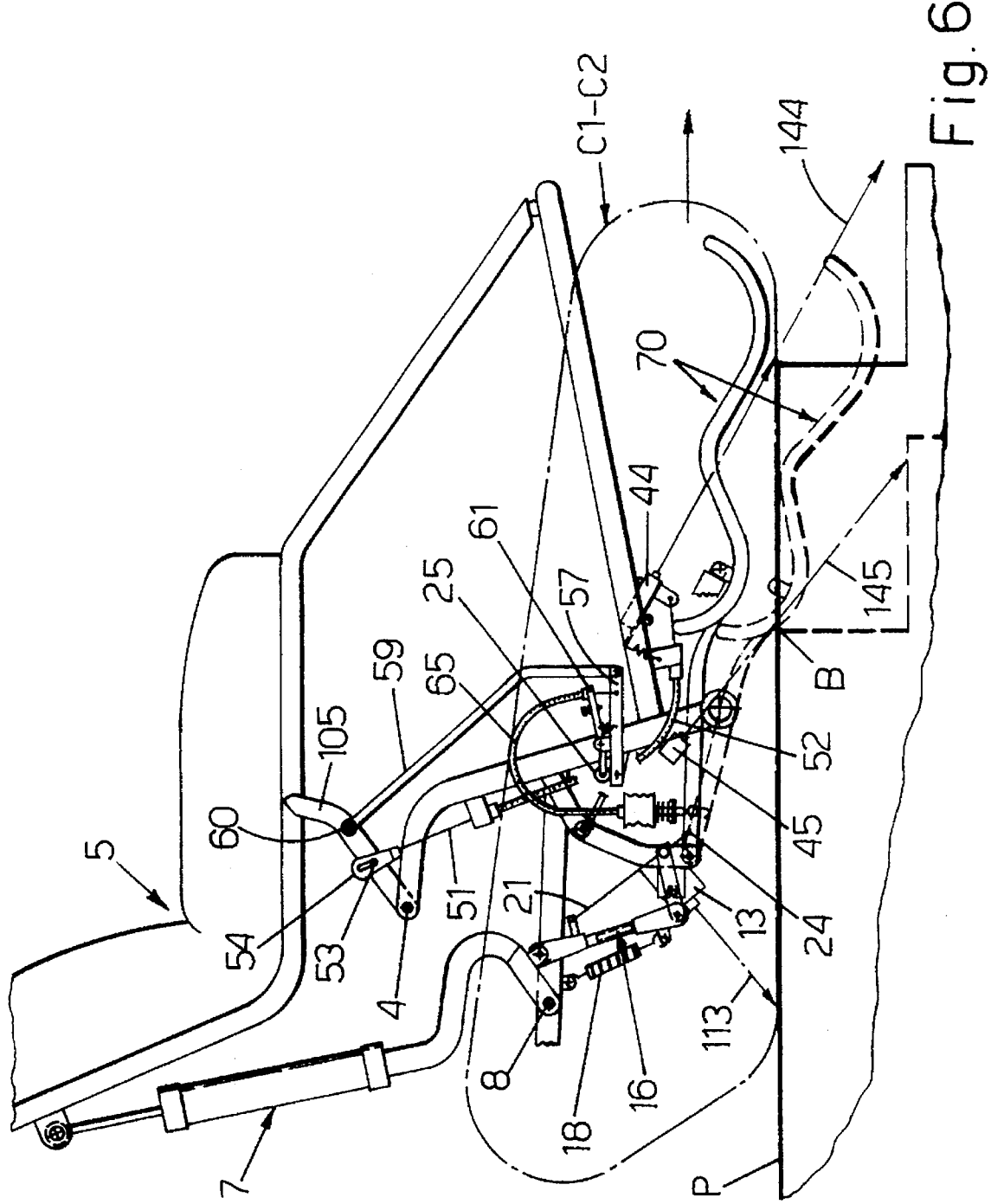

If all proceeds smoothly, the vehicle continues to climb until its centre of gravity has passed the vertical line passing through the edge B of the landing P, as shown in FIG. 5, beyond which line the rear portion of the vehicle will tip down under gravity. This condition is detected by the pressure switch 132 of the damper 32 which stops the vehicle. The vehicle gradually tips down and lays its tracks C1, C2 horizontally on the landing P, as shown in FIG. 6. The inclinometer 25 has in the meantime caused the hydraulic cylinder 7 to correct the attitude of the chair 5 so as to keep its base approximately horizontal, while the telescopic rod 16 contracts and the photocell 13 gradually rotates downwards and resumes the rest position shown in FIG. 1.

When the tracks C1, C2 are flat on the landing P, the pressure switch 132 changes state and the unit 38 sends a signal to the winch 28 to raise the rear runner 29 and when the microswitches 34 and 37 detect that this condition has been reached, the controls 42 are re-enabled to allow the vehicle to travel.

When the vehicle is reversing, as already described, only the rear photocell 13 is active. However, this is deactivated while the vehicle is travelling forwards, and the front photocell 44 and intermediate safety cell 45 (FIG. 1) are active instead. Both these photocells are inclined downwards and forwards so as to anticipate and detect the presence of voids with suitable optical amplification. More particularly, it will be seen that the front photocell 44 is mounted on a lever 46 hinged at an intermediate point 47 of itself to one side of the front centre part 403 of the frame 3 and connected at the rear end to a tension spring 48 that tends to keep said photocell pressed against a stop 49 mounted on said frame. When the vehicle is travelling on the level, the field of view 144 of the photocell 44 forms an internal angle 50 of approximately 29°–30° with the horizontal. At the opposite end of the lever 46 from the end with the spring 48 is a lug to which there is connected, at connection 146, the end of a steel cable 51 that runs through a sheath 52 whose ends abut against supports 152, 252 integral with the frame 3 and whose terminal end runs up towards the intermediate point of one of the lower arms 105 of the frame of the chair 5. This arm has a pin 53 that fits in a longitudinal slot 154 in a plate 54 attached to the end of the cable 51 which emerges from the top of said sheath. When the vehicle is set for travelling on the level, the pin 53 is in the bottom end of the slot 154. In this same condition, a microswitch 55 mounted on said arm 105 engages with the part 103 of the chair supporting frame (see below).

Meanwhile the safety photocell 45 is mounted on the central part of the frame 3 and its field of view 145 points forwards to explore a point on the track supporting surface situated ahead and at a suitable distance, for example about 5–7 cm ahead of the vertical line passing through the centre of gravity of the vehicle.

Still in FIG. 1, it can be seen that in the intermediate portion of the frame 3, hinged at hinge 56 parallel with the hinge 4, is a lever 57 which is approximately parallel with the base of the chair 5 and hinged at hinge 58 to a rod 59 whose other end is hinged at hinge 60 to the intermediate part of an arm 105 of the chair. The distances between the hinges 4, 60 and 56, 58 are preferably equal or at any rate such that the aforesaid parts form a hinged parallelogram, the lever 57 of which follows in a directly proportional way the changes in attitude of the base of the chair 5. The inclinometer 25 is mounted on the end of a lever 61 hinged at an intermediate point 62 of itself to a lug on the intermediate part of said lever 57 and the inclinometer is normally kept more or less resting on this lever by the action of a spring 63 which tends to separate the parts 57 and 61 and keeps them an appropriate set distance apart at their ends where the lever 61 has an ajustable stop 64 and, attached to its end, a flexible sheath 65 through which runs a steel cable 66 anchored to the lever 57. The other end of the sheath 65 is fastened to the top of a guide 274 fixed to the frame 3 (see below) containing a sliding pin 67 connected to the other end of said cable 66, which projects from the bottom of this guide, is pulled down by a spring 68 and is normally in abutment against a stop 69 integral with the lever of the known front runner 70 (FIGS. 6, 11) hinged at hinge 71 to the part 303 of the frame 3. When the vehicle is set for travelling on the level, with the runner 70 raised, the pin 67 is also raised and the lever 64 is in the position shown in FIG. 1, with the inclinometer 25 more or less resting on the lever 57.

Figure 11:
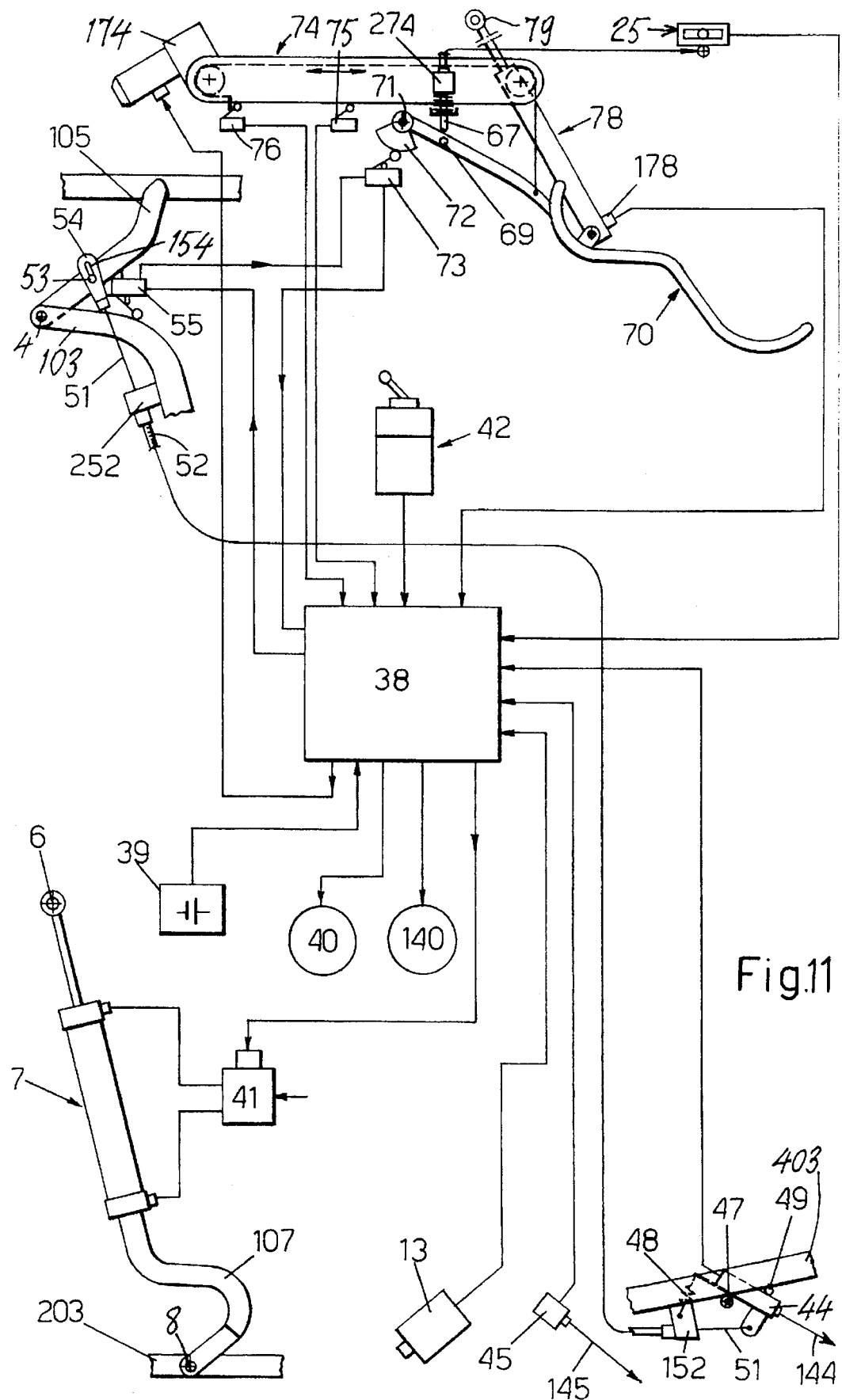

In FIG. 11, 72 indicates the cam mounted on the hinged end of the front runner 70 to change the state of a microswitch 73 when this runner is at rest or lowered. 74 indicates the small motor-driven winch with motor 174, also known from the patent cited in the introduction to the present account, by which the runner 70 is raised and lowered and which is fitted with limit microswitches 75, 76. The guide 274 discussed above is integral with the body of the winch 74. The runner 70 is hinged at hinge 77 to a damper 78 that has a pressure switch 178 and is hinged in turn at hinge 79 to the intermediate portion of the frame 3.

Figure 9:
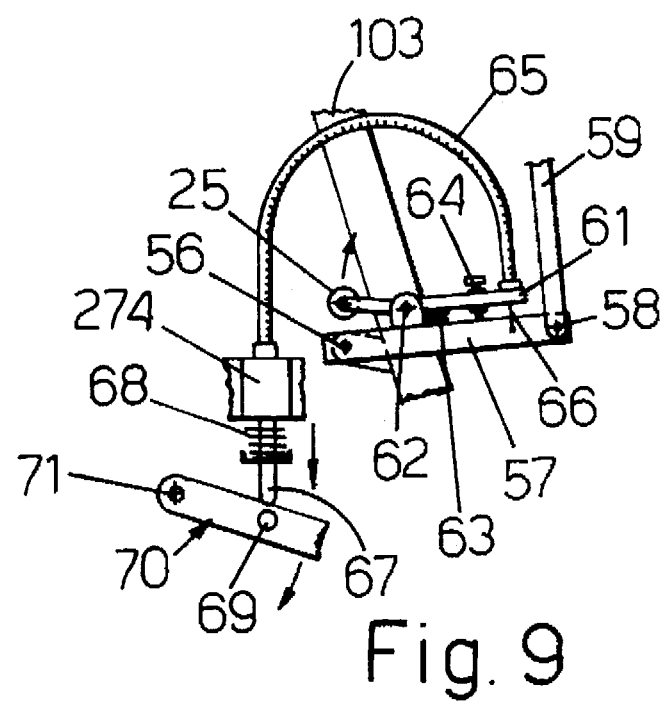
FIG. 9 is an enlarged lateral elevation of the device on which the inclinometer is mounted and which is sensitive to the movement of the front runner of the vehicle.

When descending a flight of stairs, the vehicle travels forward and functions in the following manner. When the field of view 144 of the front photocell 44 has passed over the edge B of the landing, as indicated in continuous lines in FIG. 6, this photocell causes the front runner 70 to be lowered. As illustrated in FIG. 9, this lowering leads to the lowering of the pin 67 which, via the sheath 65 and cable 66, causes the inclinometer 25 to pivot upwards by an amount determined by the adjustable stop 64 that abuts against the lever 57. The lifting of the pressure switch actuates the hydraulic cylinder 7 which tilts the chair backwards a suitable amount in order the better to prepare the user for the descent and avoid his having the sensation of falling forwards when the tracks of the vehicle tilt under gravity over the edge of the landing and onto the steps of the stairs.

Meanwhile the vehicle is continuing to advance and when the field of view 145 of the safety photocell 45 passes beyond the edge B of the landing, as indicated in broken lines, still in FIG. 6, when there is still a distance of about 10 cm before the vehicle reaches the point where it rotates forward under gravity (see below), the control unit 38 triggers an acoustic alarm (not illustrated) to indicate that the safety photocell has operated and checks whether the microswitch 55 connected to the chair has changed its state, meaning that the chair is "open", and also checks whether the microswitch 72 has likewise changed its state, meaning that the front runner 70 has dropped down. For this purpose, as illustrated in FIG. 11, the microswitches 55 and 73 have been connected in series. When the field of view of the safety photocell passes beyond the edge B of the landing, if both microswitches 55 and 73 have changed their initial state, the vehicle continues to advance, whereas if their state is not changed the unit 38 not only triggers the acoustic alarm but also stops the vehicle, which can only be restarted in reverse. However, if everything proceeds as it should, the vehicle continues to advance until it is in the condition shown in FIG. 7 in which the centre of gravity of the vehicle has moved over the edge B of the landing and the vehicle begins to rotate downwards under gravity, shifting its weight onto the damper 78. The pressure switch 178 of this damper changes state and causes the vehicle to stop. The vehicle gradually rotates downwards until its tracks are resting with equal pressure on the steps of the stairs, as shown in FIG. 8, the damper attenuating and controlling this rotation the while. During this phase the inclinometer 25 is sending the necessary signals for correcting the attitude of the chair to keep its base approximately horizontal and tilted slightly back as a result of the initial correction of attitude described earlier.

Figure 7:
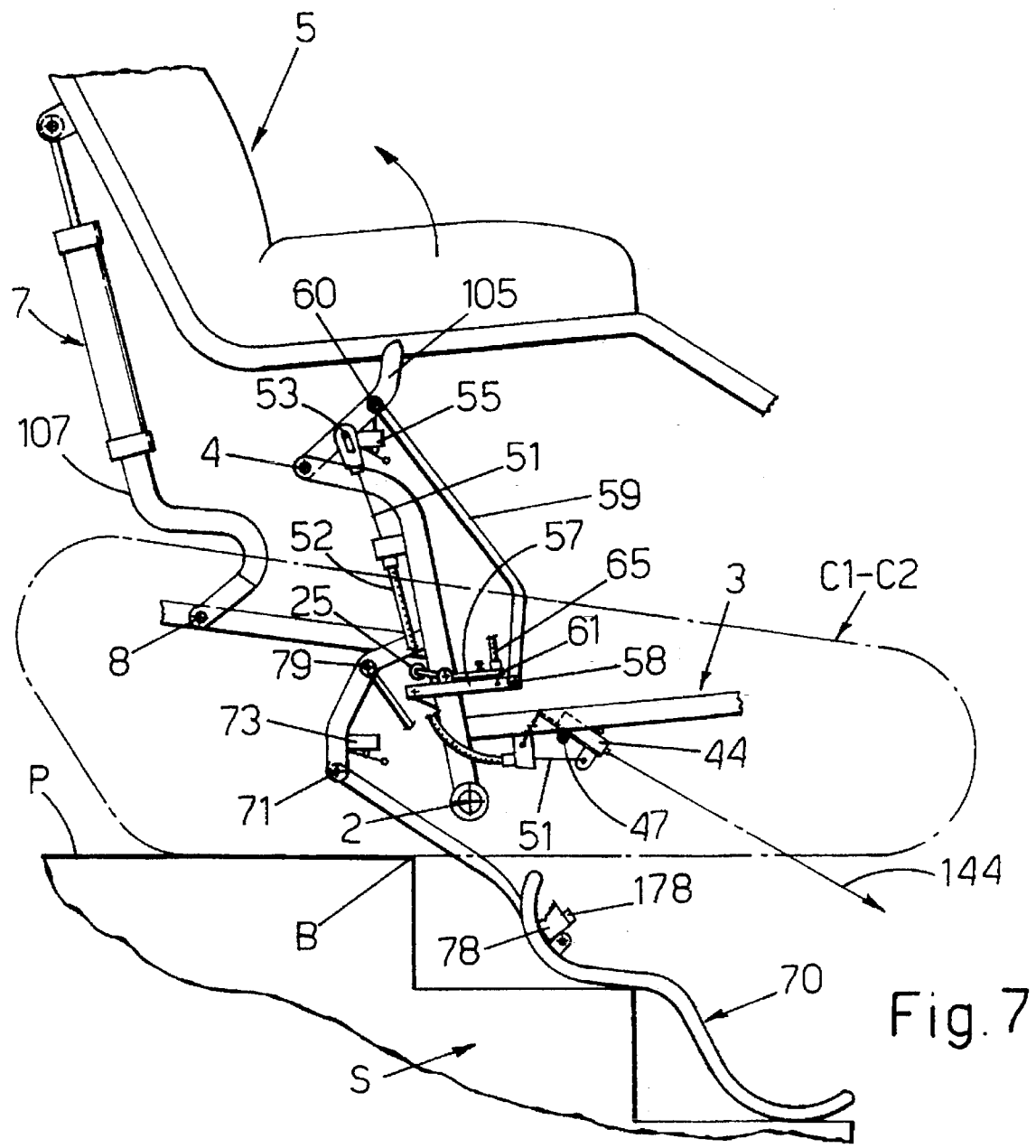
FIGS. 7 and 8 illustrate the vehicle from the side and in successive stages of operation during the descent of a flight of stairs.
Figure 8:
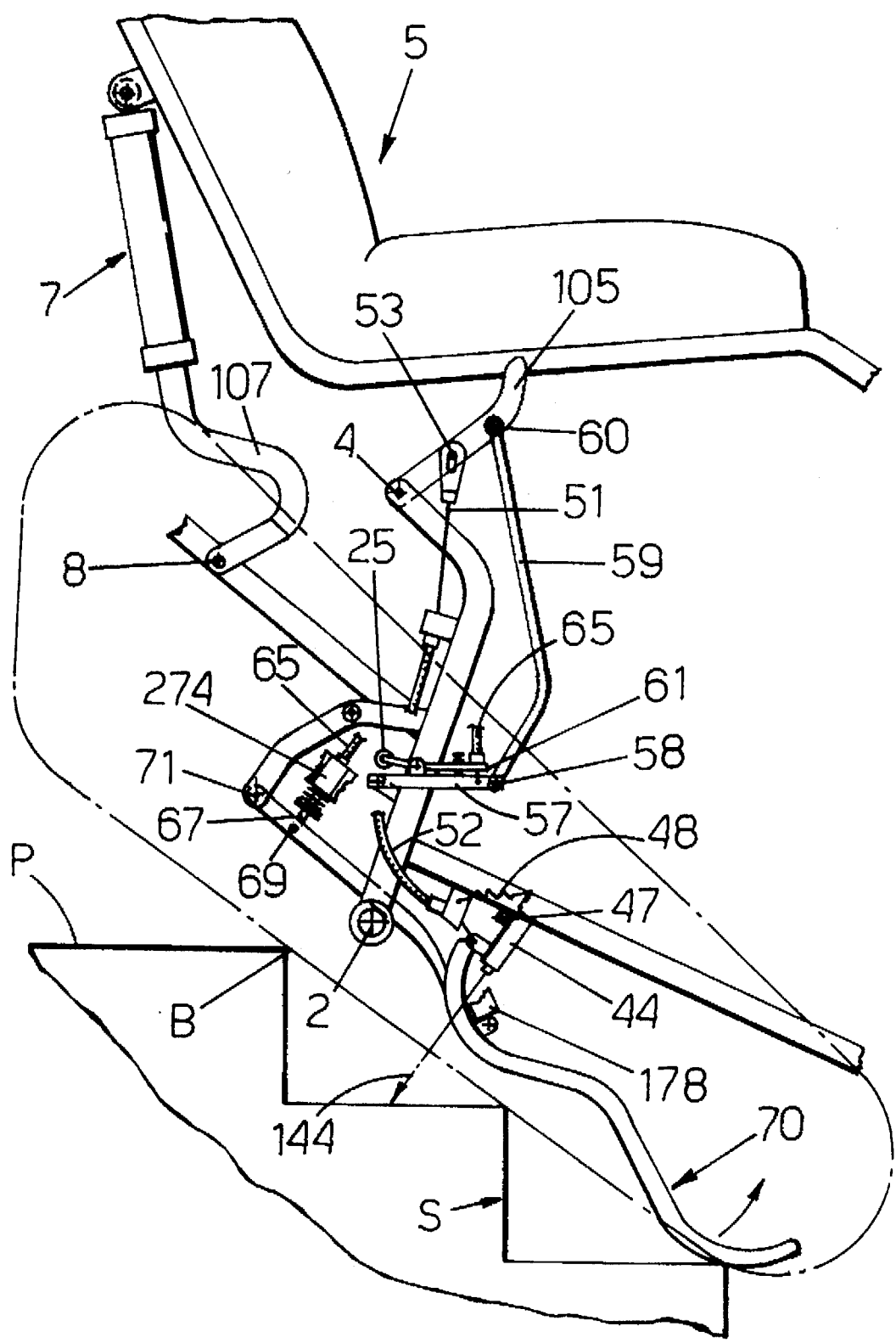

As the vehicle is progressing from the condition shown in FIG. 7 to that shown in FIG. 8, the cable 51 is pulled by the arm 105 to which it is connected and the photocell 44 rotates clockwise until its field of view is more or less perpendicular to the theoretical plane supporting the tracks C1, C2, as in fact illustrated in FIG. 8. In this position the photocell senses the succession of steps of the stairs without being influenced by the voids between the steps, which is what would happen if it retained its initial orientation.

When the vehicle's tracks are supported by the steps of the stairs, the pressure switch 178 of the damper changes state and triggers the lifting of the front runner 70 which, as it returns to the raised position, lifts the pin 67 and returns the lever 61 of the inclinometer 25 to the original open position relative to the supporting lever 57 (FIG. 1), as a result of which the anticipatory backward tilting initially given to the chair is recovered. The chair thus keeps its base horizontal.

When the runner 70 is fully lifted and its microswitch 72 changes state, the vehicle can begin to advance again and when it comes to the landing and is gradually made horizontal, accompanied by gradual closing of the chair 5 onto the supporting frame 3, the spring 48 causes the front photocell to rotate anticlockwise and revert to the condition it had at the start of the cycle as in FIGS. 1 and 6.

The microswitch 55 is also used at circuit level in order to prevent the vehicle being prepared for travelling on wheels when said microswitch is in the condition that indicates the "open" state of the chair 5, because the vehicle is climbing up or down a flight of stairs. When the microswitch 55 is in the chair-open condition, the vehicle can progress only on the tracks.

It will be understood that the description has been made with reference to a preferred embodiment of the invention, to which many variations and modifications may be made, especially from the point of view of construction, without however departing from the underlying principle of the invention as set forth above, as illustrated and as claimed below. In the following claims, references in brackets are provided purely in order to facilitate the reading of the claims and must not therefore be interpreted as in any sense restrictive of the scope of protection of the claims.

I claim:

1. A powered tracked vehicle comprising:

a base frame having an upwardly-oriented intermediate part;

at least one pair of powered tracks attached to said base frame for moving said frame forwards and backwards along a surface;

a chair having a seat and a transversely pivoting chair frame to which said seat is attached and which said chair frame is supported on said intermediate part of said base frame;

a hydraulic actuator attached at one end to said chair frame and at another end to said base frame, said actuator being controlled by an electrohydraulic control unit;

an inclinometer which senses changes in attitude of said chair and which controls actuation of said electrohydraulic control unit to actuate said hydraulic actuator to maintain an attitude of said seat always approximately horizontal;

a front photocell, a middle photocell and a rear photocell mounted to said base frame and oriented downwards to explore the surface during movements of the vehicle forwards and backwards;

a front adjusting means for automatically adjusting the orientation of said front photocell during various operating conditions of the vehicle in order to adapt to these conditions and ensure as great as possible operational safety of the vehicle; and a rear adjusting means for automatically adjusting the orientation of said rear photocell during various operating conditions of the vehicle in order to adapt to these conditions and ensure as great as possible operational safety of the vehicle.

2. A powered tracked vehicle as claimed in claim 1:

wherein said rear adjusting means normally orients said rear photocell with a backwards inclination so that said rear photocell has a field of view which mostly covers the surface adjacent a rear end of said tracks and forms with the surface an acute angle in order to detect possible voids in the surface when the vehicle is travelling along a level portion of the surface; and wherein said rear adjusting means rotates said rear photocell about a transverse axis when the vehicle is negotiating a flight of stairs in order to raise the field of view thereof and to ensure that when said rear photocell reaches an edge of an upper landing of the stairs the field of view of said rear photocell forms a narrow acute angle with the landing so that as this edge is passed by the field of view said rear photocell immediately detects that the landing has been reached and that the vehicle should be prepared for arrival on the landing.

3. A powered tracked vehicle as claimed in claim 2 wherein said rear adjusting means adjusts the orientation of said rear photocell to have a field of view when the vehicle is travelling on the level portion of the surface which forms an angle of about 40° with the level portion, and wherein said rear adjusting means adjusts the orientation of said rear photocell to have a field of view when the vehicle is negotiating stairs which forms an angle of about 5° with the horizontal.

4. A powered tracked vehicle as claimed in claim 2 wherein said rear adjusting means includes:

a projection extending from said base frame, a pin rotatably supported by said projection and extending transversely therefrom relative to the vehicle and perpendicular to the field of view of said rear photocell, a support attached to said pin to which said rear photocell is fixed, a lever having an intermediate part fixed transversely to said pin, a telescopic rod hinged to a first end of said lever, a spring which urges said telescopic rod towards a contraction thereof, an arm hinged to a second end of said lever, said arm being hinged also to said base frame and carrying a base body of said hydraulic actuator, a cable having a first end fixed to a top part of said telescopic rod and a free end with a non-withdrawable enlargement thereat, a guide bush through which said cable passes, said guide bush being rotatably mounted on said second end of said lever, wherein a first distance between said second end of said lever where said guide bush is mounted and said pin to which said intermediate part of said lever is fixed is equal to a second distance between a point of connection of said arm to said base frame and a point of hinged connection of said telescopic rod to said base frame, and wherein said first and second distances are related to a third distance between a point of hinged connection of said telescopic rod to said first end of said lever and said pin such that during a first approximate 13°–15° of tilting of said tracks when said vehicle is climbing stairs in reverse, the field of view of said rear photocell is rotated upwards until a positive angle of approximately 5° is formed with the horizontal while said telescopic rod remains contracted and the enlargement of said free end of said cable abuts against said guide bush, and such that any further upward rotation of said tracks produces an equal downward rotation of said rear photocell whose 5° inclination remains unchanged while said telescopic rod lengthens proportionally.

5. A powered tracked vehicle as claimed in claim 2 and further including:

a rear runner hinged to said intermediate part of said base frame for movement between a rest position and an active position, a motor-driven winch mounted on said base frame which moves said rear runner between the rest position and the active position when said rear photocell detects and passes over the edge of the upper landing of stairs up which said vehicle is climbing in reverse, a damper which controls the movement of said rear runner, said damper including a pressure switch, a cam provided at a hinged connection of said rear runner to said intermediate part of said base frame, a microswitch which is actuated by movement of said cam as said rear runner moves from the rest position to the active position and back again, and a vehicle control unit including a timer circuit connected to said microswitch such that if said microswitch actuated by movement of said rear runner does not switch a state thereof within a predetermined interval of time after said rear photocell detects passage over the edge of the upper landing, said vehicle automatically stops reversing and can only descend.

6. A powered tracked vehicle as claimed in claim 1:

wherein said front photocell is located in a front center part of said base frame and normally points forwards in a rest position so that a front field of view thereof mostly covers a level portion of the surface in front of said vehicle as said vehicle travels forwards, the front field of view forming an acute angle with the level portion of the surface in order to detect any voids in the surface as said vehicle moves forwards;

wherein said front adjusting means includes a support which is hingedly attached to said base frame and to which said front photocell is attached, a stop on said base frame, a spring means for resiliently urging said support against said stop causing said front photocell to assume the rest position, a cable connected at one end to said support and at another end to said chair frame, a sheath fixed at each end to said base frame and through which said cable runs, such that when said vehicle is travelling forwards and moving from a landing to a flight of stairs and then travelling down the stairs, said front photocell rotates progressively downwards due to movement of said cable in said sheath whereby the front field of view is approximately perpendicular to an incline of the stairs, and such that when said vehicle reaches a level portion of the surface and said tracks revert to a horizontal position, said spring means automatically returns said front photocell to the rest position.

7. A powered tracked vehicle as claimed in claim 6 wherein said front adjusting means further includes:

a plate having a longitudinal slot therein, said cable being attached to an end of said plate, a lower arm fixed to said chair frame, and a pin fixed to said lower arm and being in sliding engagement with said slot of said plate whereby the field of view of said front photocell is not modified from the rest position when said chair is first inclined backwards due to a lost motion of said pin in said longitudinal slot until said pin engages a back end of said slot.

8. A powered tracked vehicle as claimed in claim 6 and further including:

a front runner hinged to a rear center of said base frame for movement between a raised rest position and a lowered active position, a motor-driven winch mounted on said base frame which moves said front runner between the rest position and the active position when said front photocell detects a passing over of an edge of an upper landing of stairs down which said vehicle is climbing, a damper connected to said base frame which controls the movement of said front runner, said damper including a pressure switch, a cam provided at a hinged connection of said front runner to said base frame, a first microswitch which is actuated by movement of said cam as said front runner moves from the rest position to the active position and back again, a second microswitch mounted to detect a movement of said chair frame from a closed condition used when said vehicle is travelling on a level portion of the surface and an open condition used when said vehicle is travelling on stairs, said second microswitch and said first microswitch being connected in series;

wherein said middle photocell is located behind said front photocell and has a field of view which views forwardly; and wherein during an initial phase of descent of said vehicle down the flight of stairs when said middle photocell has also detected a passing of the edge of the upper landing of the flight of stairs, if said first microswitch and said second microswitch have not both changed a state thereof with respect to an initial condition which existed when said vehicle was travelling on the level portion of the surface, said vehicle is stopped and prepared for reverse movement.

9. A powered tracked vehicle as claimed in claim 8 wherein said powered tracks include a control unit which detects a change of state of said second microswitch from the initial condition and prevents said powered tracks from being moved at a fast speed relative to a slow speed at which said vehicle is designed to move on the stairs.

10. A powered tracked vehicle as claimed in claim 1 and further including:

a lever having a first end hinged to a bottom center part of said base frame at one side of said base frame and a second end, said lever being approximately parallel to the seat of the chair and having said inclinometer attached thereto, a lower arm of said chair frame which is hingedly attached to said intermediate part of said base frame, and a rod hingedly attached at one end to said second end of said lever and hingedly attached at another end to an intermediate part of said lower arm, such that a hinged parallelogram is formed which keeps said lever always approximately parallel with the seat of the chair.

11. A powered tracked vehicle as claimed in claim 10 and further including:

a second lever which is hingedly mounted at an intermediate part thereof to said first-mentioned lever, said second lever having a third end to which said inclinometer is attached and a fourth end positioned a distance from said first-mentioned lever, a spring means for resiliently urging said fourth end of said second lever away from said first-mentioned lever, a sheath having a first end fixed to said fourth end of said second lever and a second end, a guide bush fixed to said base frame and to which said second end of said sheath is attached, said guide bush including a pin oriented downwards which slides in said guide bush, and a spring which urges said pin downwards, a front runner hinged to said base frame for movement between a raised rest position and a lowered active position, said front runner assuming the active position when said vehicle is descending a flight of stairs, a third lever which supports said front runner and which includes an integral support against which said pin normally abuts, and a cable which runs through said sheath, said cable having a first end fixed to said pin and a second end fixed to said second lever whereby said inclinometer is moved upwards when said front runner moves to the active position.

* * * * *